(12) United States Patent
Qiu et al.

(10) Patent No.: US 11,783,691 B1
(45) Date of Patent: Oct. 10, 2023

(54) BEIDOU COMMUNICATION-BASED INTEGRATED MONITORING SYSTEM FOR SLOPE SURFACE CRACK

(71) Applicant: NORTHWEST UNIVERSITY, Xi'an (CN)

(72) Inventors: Haijun Qiu, Xi'an (CN); Yaru Zhu, Xi'an (CN); Bingzhe Tang, Xi'an (CN); Ya Liu, Xi'an (CN)

(73) Assignee: Northwest University, Xi'an (CN)

( * ) Notice: Subject to any disclaimer, the term of this patent is extended or adjusted under 35 U.S.C. 154(b) by 0 days.

(21) Appl. No.: 18/209,606

(22) Filed: Jun. 14, 2023

(30) Foreign Application Priority Data

Oct. 17, 2022 (CN) .......................... 202211264841.4

(51) Int. Cl.
  *G08B 21/10* (2006.01)
  *G01B 21/32* (2006.01)
  *G01B 21/04* (2006.01)
  *G01W 1/10* (2006.01)

(52) U.S. Cl.
  CPC ............. *G08B 21/10* (2013.01); *G01B 21/04* (2013.01); *G01B 21/32* (2013.01); *G01W 1/10* (2013.01)

(58) Field of Classification Search
  CPC ........ G08B 21/10; G01B 21/04; G01B 21/32; G01W 1/10
  See application file for complete search history.

(56) References Cited

FOREIGN PATENT DOCUMENTS

| CN | 108332649 A | 7/2018 |
|----|-------------|--------|
| CN | 111524322 A | 8/2020 |
| CN | 115325928 A | 11/2022 |

OTHER PUBLICATIONS

CN Notification to Grant Patent Right for Invention with English Translation, Application No. 202211264841.4, Issue No. 2022121100830600, Applicant: Northwest University; Sinosteel Maanshan General Institute of Mining Research Co., Ltd., Title: Beidou Communication-Based Integrated Monitoring System for Slope Surface Crack, dated Dec. 28, 2022.
CN First Office Action with English Translation, Application No. 202211264841.4, Issue No. 2022112302269850, Applicant: Northwest University; Sinosteel Maanshan General Institute of Mining Research Co., Ltd., Title: A Comprehensive Landslide Surface Crack Monitoring System based on Beidou Communication, dated Nov. 28, 2022.

*Primary Examiner* — Curtis B Odom
(74) *Attorney, Agent, or Firm* — Reising Ethington P.C.

(57) ABSTRACT

Disclosed is a Beidou communication-based integrated monitoring system for a slope surface crack, which in particular relates to the field of geological disaster monitoring. Due to a certain trend of landslide damage degrees, and consequent offsets of a slope area over time, monitoring points pre-arranged possibly become non-optimal monitoring points with undesired monitoring effects. In view of this, the present disclosure includes an arrangement module, a monitoring module, an early warning module and a supervision module; and a slope offset threshold is set according to information of a slope, and configured to determine whether positions of the monitoring points are located in a normal area, and under the condition that a slope offset exceeds the threshold, it is indicated that the monitoring points cannot properly monitor the slope area, and need to be rearranged according to an offset direction.

9 Claims, 2 Drawing Sheets

BEIDOU COMMUNICATION-BASED INTEGRATED MONITORING SYSTEM FOR SLOPE SURFACE CRACK

CROSS REFERENCE TO RELATED APPLICATION

This patent application claims the benefit and priority of Chinese Patent Application No. 202211264841.4, filed with the China National Intellectual Property Administration on Oct. 17, 2022, the disclosure of which is incorporated by reference herein in its entirety as part of the present application.

TECHNICAL FIELD

The present disclosure relates to the technical field of geological disaster monitoring, in particular to a Beidou communication-based integrated monitoring system for a slope surface crack.

BACKGROUND

A landslide is a common natural disaster. Some landslides present minor hazards, which include destruction of farmland, houses, forests, roads, agricultural machinery facilities and water conservancy and hydropower facilities, and damage to people and animals, leading to enormous losses to industrial and agricultural production and property of the people. Some other landslides present major hazards, which include destructive disasters, endangering life security of the people. In view of the disastrous consequences of landslide accidents, it is more important to focus on pre-disaster prevention and monitoring and early warning of landslide risks than post-disaster restoration of rescue protection.

An existing global navigation satellite system (GNSS) features real-time, dynamic, remote and automatic measurement, and can be used for monitoring slope deformation on account of its high precision. With the aid of various monitoring sensors and Beidou communication, stability of deep displacement and cracks of a slope can be monitored.

As described above, various monitoring sensors and Beidou positioning receivers of an existing monitoring system are required to be mounted at several monitoring points in a landslide section for landslide monitoring. However, it is impossible to accurately predict the whole process of landslide damage or determine a spot that cracks first in the slope and an evolution process of landslide damage, or accurately locate a key point for landslide prevention and control before most monitoring points are arranged. Besides, due to a certain trend of landslide damage degrees, and consequent offsets of a slope area over time, monitoring points pre-arranged possibly become non-optimal monitoring points with undesired monitoring effects.

In view of the technical shortcomings, a solution is proposed.

SUMMARY

In order to overcome the above shortcomings in the prior art, an embodiment of the present disclosure provides a Beidou communication-based integrated monitoring system for a slope surface crack. An error threshold of a monitoring point is set in a targeted manner according to actual condition of a slope, and arrangement of the monitoring point is re-adjusted by determining whether a main sliding direction and a range offset of the slope exceed the error threshold, so as to solve the problems raised in the above background.

In order to achieve the above objective, the present disclosure provides the following technical solution:

A Beidou communication-based integrated monitoring system for a slope surface crack includes an arrangement module, a monitoring module, an early warning module and a supervision module; where the arrangement module is configured to determine positions of monitoring points of the monitoring system according to slope information;

the monitoring module is configured to monitor ecological data of a slope and meteorological information of a slope area, and send the ecological data of the slope and the meteorological information of the slope area to the early warning module and the supervision module;

the early warning module is configured to analyze a sliding trend and an offset degree of the slope according to the information sent by the monitoring module, determine whether geological deformation of the slope and arrangement positions of the monitoring points are in a normal state according to an analysis result, and give an alarm for a slope area and a position of a monitoring point in an abnormal state; and the supervision module is configured to supervise a communication state between modules, the arrangement positions of the monitoring points and an early warning state of the slope.

In a preferred implementation mode, the arrangement module includes a slope information unit and a survey line layout unit;

the slope information unit is configured to confirm information of a slope to be monitored; and the survey line layout unit is configured to preliminarily lay out a monitoring network of the slope and monitoring points on the monitoring network according to the information of the slope;

the information of the slope including soil quality information, a gradient, geological information, and area information of the slope and environmental information of the slope area.

In a preferred implementation mode, the monitoring module includes a positioning data monitoring unit, a sensor monitoring unit, a meteorological monitoring unit and a monitoring station management unit;

the positioning data monitoring unit is configured to acquire Beidou high-precision positioning coordinate data, and monitor displacement deformation of the slope;

the sensor monitoring unit is configured to monitor real-time rainfall, a crack degree and a soil water content in the slope area;

the meteorological monitoring unit is configured to monitor a meteorology and predict a meteorological state of the slope area; and the monitoring station management unit is in communication link with the positioning data monitoring unit, the sensor monitoring unit and the meteorological monitoring unit, and is configured to store and manage monitoring information and address information of a monitored area.

In a preferred implementation mode, the early warning module includes a data storage unit, an analysis and processing unit and a reminding and warning unit;

the data storage unit is configured to store various monitoring data monitored by the monitoring module;

the analysis and processing unit is configured to compare the monitoring data stored in the data storage unit with a pre-set early warning threshold, so as to obtain the geological deformation of the slope and monitoring effects of the monitoring points, determine whether the geological deformation of the slope and the monitoring effects of the monitoring points exceed the threshold, and send a comparison result to the reminding and warning unit and the supervision module; and the reminding and warning unit is configured to issue early warning information according to received comparison result sent by the analysis and processing unit.

In a preferred implementation mode, the supervision module includes a communication supervision unit, an electronic display unit and a system log unit;

the communication supervision unit is in communication link with the above modules, and configured to determine whether communication between the modules is normal;

the electronic display unit is configured to display positions of the monitoring points, monitoring data of the monitoring point and an early warning state of the monitoring point; and the system log unit is configured to record a login account, a login IP and login time information, and search for an operation type of the account.

In a preferred implementation mode, a plurality of danger early-warning levels, that is, a first-level early warning, a second-level early warning, a third-level early warning and a fourth-level early warning in descending order are set in the analysis and processing unit; and the analysis and processing unit further sets danger early-warning level thresholds of the slope and the slope offset threshold according to the information of the slope.

In a preferred implementation mode, the danger early-warning level thresholds are configured to determine whether a deformation rate of the slope, cumulative deformation of the slope, deformation acceleration of the slope, a crack opening degree, rainfall per unit time and soil water content computed by the analysis and processing unit reaches a certain early warning level, and under the condition that a certain index reaches a certain early warning level, an early warning of a highest level is given.

a slope offset threshold is configured to determine whether the positions of the monitoring points are located in a normal area, and under the condition that a slope offset exceeds the threshold, the monitoring points need to be rearranged according to an offset direction.

In a preferred implementation mode, the analysis and processing unit divides the slope area according to the information of the slope, and sets thresholds for positions; and under the condition that a deformation position of the slope occurs at a boundary of an area divided by the analysis and processing unit, the analysis and processing unit uses a threshold with a small threshold range for an early warning.

In a preferred implementation mode, the analysis and processing unit further includes a first compulsory unit, the first compulsory unit is configured to compulsorily give an early warning of a monitoring point having a slope offset when the slope is in an early warning level; and when an early warning level of a slope area where the monitoring point is located monitored by the first compulsory unit is the second-level early warning or below, an alarm for a position of the monitoring point is compulsorily given.

In a preferred implementation mode, the analysis and processing unit further includes a second compulsory unit, the second compulsory unit is configured to compulsorily give an early warning of the position of the monitoring point according to future rain early-warning information sent by the meteorological monitoring unit.

The Beidou communication-based integrated monitoring system for a slope surface crack according to the present disclosure has technical effects and advantages as follows:

1. According to the present disclosure, the slope offset threshold is set according to the information of the slope, and configured to determine whether a position of the monitoring point is located in the normal area, and under the condition that the slope offset exceeds the threshold, it is indicated that the monitoring point may not properly monitor the slope area, and needs to be rearranged according to the offset direction. In view of the threshold, the monitoring point may be guaranteed to perform accurate monitoring, and invalid monitoring by the monitoring points is avoided. In addition, the slope may be monitored again in time according to the slope offset.

2. According to the present disclosure, the slope area to be monitored is divided according to the information of the slope, and thresholds are set for the positions, such that an overall monitoring and early warning effect is better; and under the condition that the deformation position of the slope occurs at the boundary of the area divided by the analysis and processing unit, the analysis and processing unit uses the threshold with the small threshold range for an early warning, so as to guarantee to avoid a determination error of a slope area with higher risks due to slope area with lower risk, and guarantee safety of the slope.

3. According to the present disclosure, by arranging the first compulsory unit, when the slope is in the early warning level, the early warning of the monitoring point having the slope offset is compulsorily given, so as to guarantee that relevant workers may rearrange the monitoring point in time, and facilitate targeted and accurate monitoring of a slope area where a slope early-warning is sent.

4. According to the present disclosure, by setting the second compulsory unit, the early warning of the position of the monitoring point is compulsorily given according to the future rain early-warning information sent by the meteorological monitoring unit, so as to remind relevant workers to rearrange the monitoring point in advance according to the offset direction of the slope, and avoid a poor monitoring effect caused by difficulty in rearranging the monitoring point due to heavy rainfall.

DETAILED DESCRIPTION OF THE EMBODIMENTS

The technical solutions in embodiments of the present disclosure will be clearly and completely described below with reference to accompanying drawings in the embodiments of the present disclosure. Apparently, the described embodiments are merely some embodiments rather than all embodiments of the present disclosure. All the other embodiments derived by those of ordinary skill in the art based on the embodiments of the present disclosure without creative efforts shall fall within the protection scope of the present disclosure.

Embodiment 1

The present disclosure provides a Beidou communication-based integrated monitoring system for a slope surface crack. An error threshold of a monitoring point is set in a targeted manner according to actual condition of a slope, and arrangement of the monitoring point is re-adjusted by determining whether a main sliding direction and a range offset of the slope exceed the error threshold, such that the monitoring point may be guaranteed to be adjusted according to a state of the slope, and a desirable monitoring effect of the slope is guaranteed.

Figure 1:
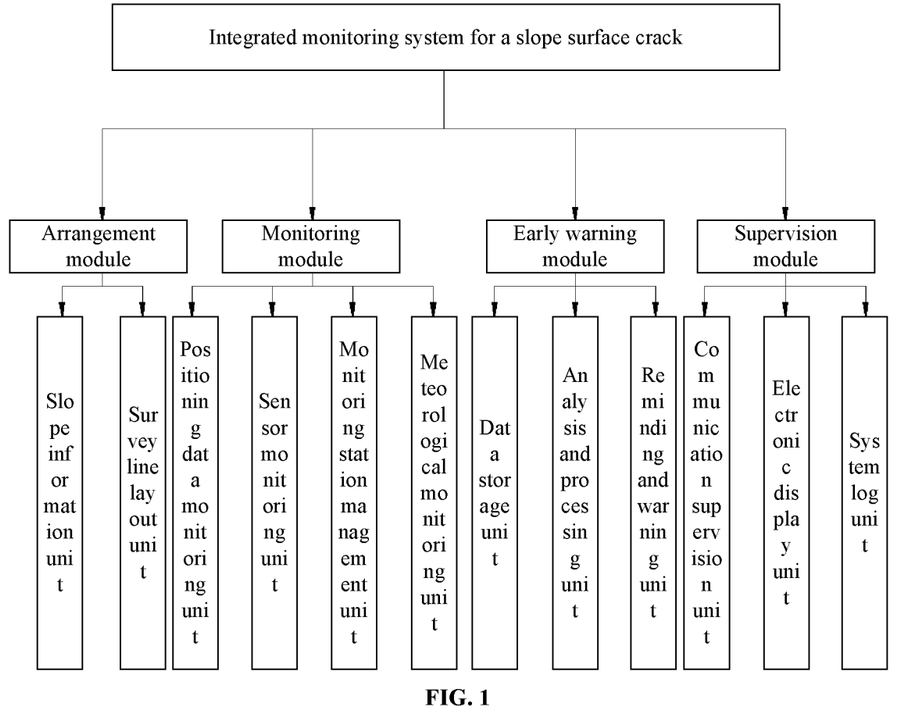
FIG. 1 is a schematic structural diagram of a Beidou communication-based integrated monitoring system for a slope surface crack according to the present disclosure.

Specifically, with reference to FIG. 1, the Beidou communication-based integrated monitoring system includes an arrangement module, a monitoring module, an early warning module and a supervision module. The arrangement module is configured to determine positions of monitoring points of the monitoring system according to slope information. The monitoring module is configured to monitor ecological data of a slope and meteorological information of a slope area, and send the ecological data of the slope and the meteorological information of the slope area to the early warning module and the supervision module. The early warning module is configured to analyze a sliding trend and an offset degree of the slope according to the information sent by the monitoring module, determine whether geological deformation of the slope and arrangement positions of the monitoring points are in a normal state according to an analysis result, and give an alarm for a slope area and a position of a monitoring point in an abnormal state. The supervision module is configured to supervise a communication state between modules, the arrangement positions of the monitoring points and an early warning state of the slope, so as to guarantee that all modules are in a normal operation state. The supervision module is in communication link with the arrangement module, the monitoring module and the early warning module.

With reference to FIG. 1, the arrangement module includes a slope information unit and a survey line layout unit, the slope information unit is configured to confirm information of a slope to be monitored, and the information includes:

soil texture information of the slope, such as soil texture, semi-rock and rock, and survey lines laid by survey line layout unit according to different soil texture conditions have different shapes;

geological information, such as a fault location, a crack location and a dangerous rock mass location, based on different geological information, positions of monitoring points are different, and are generally arranged according to fracture surfaces or sections, and the fracture surfaces are generally selected in parts with poor geological conditions, large deformation and possible damage, that is, the above fault location, the crack location and the dangerous rock mass location;

area information mainly refers to a size of the slope area, and if the slope area is too large, a plurality of fracture surfaces need to be set, and are selected based on priority according to the geological information;

environmental information mainly refers to a series of environmental indexes such as rainfall, surface runoff and a soil water content in an area where the slope is to be monitored; and the survey line layout unit preliminarily lays out a monitoring network of the slope and monitoring points on the monitoring network according to the information of the slope.

As shown in FIG. 1, the monitoring module includes a positioning data monitoring unit, a sensor monitoring unit, a meteorological monitoring unit and a monitoring station management unit.

The positioning data monitoring unit is configured to acquire Beidou high-precision positioning coordinate data, that is east-north-up (ENU) coordinate data, and then display the data in three catalogs. Monitoring data in a first catalog are displayed in the table form in real-time, deformation monitoring in a second catalog displays a changing trend of ENU coordinates in each direction in the table form in real-time, and deformation monitoring in a third catalog displays a variation of ENU coordinates in each direction in the table form in real-time. The positioning data monitoring unit of the present disclosure selects a Beidou positioning receiver with a specific model selected according to actual needs, and horizontal deformation and vertical deformation of the slope may be measured through the positioning data monitoring unit.

The sensor monitoring unit is configured to monitor real-time rainfall, crack degree and soil water content in the slope area for the convenience of comprehensive consideration.

The meteorological monitoring unit is configured to monitor the future meteorological state of the slope area for the convenience of a subsequent early warning.

The monitoring station management unit is in communication link with the positioning data monitoring unit, the sensor monitoring unit and the meteorological monitoring unit, and is configured to store and manage monitoring information and address information of a monitored area for the convenience of subsequent sending of the monitoring data to the early warning module and the supervision module.

As shown in FIG. 1, the early warning module includes a data storage unit, an analysis and processing unit and a reminding and warning unit.

The data storage unit is configured to store various monitoring data monitored by the monitoring module.

The analysis and processing unit is configured to compare the monitoring data stored in the data storage unit with a pre-set early warning threshold, so as to obtain the geological deformation of the slope and monitoring effects of the monitoring points, determine whether the geological deformation of the slope and the monitoring effects of the monitoring points exceed the threshold, and send a comparison to the reminding and warning unit and the supervision module.

The reminding and warning unit is configured to issue early warning information according to received comparison result sent by the analysis and processing unit; and automatically issue the early warning information and give a voice alarm according to a highest level of early warning if the data exceed different levels of early warning thresholds.

As shown in FIG. 1, the supervision module includes a communication supervision unit, an electronic display unit and a system log unit.

The communication supervision unit is in communication link with the modules, and configured to determine whether communication between the modules is normal. Specifically, the communication supervision unit determines a communication state by determining whether monitoring data are returned for a long time. If the monitoring data are not returned for a long time, it determines that communication is interrupted, and re-determines immediately that communication is normal in the case of data return occurring afterward. Short-time data loss if any does not fall within a communication interruption time range set by the system, and will not be processed, thereby reducing a statistical workload about abnormality of the monitoring station of a worker, further timely investigating a reason for data loss, guaranteeing a normal communication state of the system, and effectively enhancing operation and maintenance capacity of the system.

The electronic display unit is configured to display positions of the monitoring points monitoring data of the monitoring point, and an early warning state of the monitoring point, etc. The electronic display unit of the present disclosure may select an electronic map for displaying a position.

The system log unit is configured to record a login account, a login IP and login time information, and search for an operation type of the account, thereby effectively guaranteeing security of the whole system.

Embodiment 2

Embodiment 2 of the present disclosure is different from Embodiment 1 in that in Embodiment 1, an internal structure of the Beidou communication-based integrated monitoring system for a slope surface crack is generally introduced in the present disclosure, and in this embodiment, a detailed operation flow of some module units will be specifically introduced.

When determining a position of an initial monitoring point, an arrangement module mainly selects and lays out different survey lines according to slope tendencies of different soils. In the case of is a soil slope, the soil slope has an unstable state and a main sliding direction easy to grasp. In this case, cross survey lines are used for layout. In the case of a semi-rocky or rocky slope, a main sliding direction of the slope is difficult to grasp, and radial cross survey lines are used for layout for better monitoring a slope state.

A sensor monitoring unit includes sensor elements such as a rain gauge, a crack meter and a soil water content monitor that are used to measure rainfall, a crack degree and a soil water content in a slope area respectively. A state of a monitored slope area is comprehensively determined accordingly.

An early warning module is mainly configured to give an early warning after determining the slope state according to monitoring information received from the monitoring module, that is, to determine whether a position of a monitoring point exceeds a corresponding threshold according to index data of the slope area and a changing area, and to give an early warning if the monitoring point exceeds the threshold.

Specifically, the analysis and processing unit utilizes structured query language (SQL) statements to retrieve monitoring data stored from a data storage unit, processes and analyzes the same, and computes different types of early warning index values of the slope. In order to better give an alarm for a deformation trend of the slope, a plurality of danger early-warning levels, that is a first-level early warning, a second-level early warning, a third-level early warning and a fourth-level early warning in descending order are set in the analysis and processing unit of the present disclosure.

The first-level early warning indicates an extremely serious landslide risk, that is, cumulative displacement of the monitoring point seriously exceeds a standard, and the deformation rate increases exponentially. The slope may enter an early stage of an impending landslide, or there is torrential rain around a monitored area with a high soil water content, sudden increase and fusion of cracks, a small area of landslide occurs in some areas, and the probability of a large-scale landslide is extremely high. In this case, serious destructive consequences may be caused, so it is necessary to immediately take disaster prevention and avoidance measures.

The second-level early warning indicates a very serious landslide risk, that is, displacement deformation in a plurality of monitoring points in the monitored area continues to increase, an obvious accelerated deformation trend is found at some monitoring points, cracks increase obviously at many places, the deformation rate gradually increases over time without stagnancy, and disaster damage may be serious at a later stage of accelerated deformation. In this case, comprehensive preventive measures should be taken to urgently reinforce surrounding slopes.

The third-level early warning indicates a relatively serious landslide risk, that is, cumulative displacement or a displacement rate of the monitoring point relatively increases, the displacement rate is in an early stage of accelerated deformation, slope mass has abnormal cracks, and a serious harmful degree may be produced. In this case, it is necessary to issue early warning information to alert the public and take further reinforcement measures for the slope.

The fourth-level early warning indicates that landslide risk requires close attention, that is, when any early warning index of a certain monitoring point exceeds a four-level early warning threshold, a four-level early warning will be given to indicate that abnormal deformation occurs in the monitored area in this case, and may continue to increase into greater displacement over time with low landslide probability. In this case, it is necessary to remind a worker to pay attention to a slope condition with a regular harmful degree.

The analysis and processing unit of the present disclosure computes the deformation rate of the slope, the cumulative deformation of the slope, the deformation acceleration of the slope, the crack opening degree, the rainfall per unit time and the soil water content according to the data of the monitoring module, and determines a slope early-warning state in the monitored area according to a comparison of the above factor with the corresponding index threshold.

Specifically, the present disclosure computes horizontal cumulative deformation according to positioning data in an E direction and an N direction, and uses xyz to represent an ENU variable, so a formula for calculating the horizontal cumulative deformation of the slope is as follows:

$$S_{xy} = \sqrt{[ave(x) - ref(x)]^2 + [ave(y) - ref(y)]^2}$$

where $S_{xy}$ represents the horizontal cumulative deformation, $ave(x)$ and $ave(y)$ represent the averages in the E direction and the N direction within 60 seconds respectively, and $ref(x)$ and $ref(y)$ represent initial values in the E direction and the N direction respectively.

A formula for calculating vertical deformation is as follows:

$$S_z = \text{ave}(z) - \text{ref}(z)$$

where $S_z$ represents vertical cumulative deformation, ave(z) represents an average in a U direction within 60 seconds respectively, and ref(z) represents an initial value in U direction.

The deformation rate of the slope is a variation of the deformation per unit of time, and has a calculation formula as follows:

$$V = \partial S / \partial t$$

For the convenience of expression, in the formula, $$\partial S / \partial t$$

represents a partial differential of the horizontal accumulated deformation and vertical accumulated deformation with respect to time; and V represents a general name for the deformation rate of the slope, and includes a horizontal deformation rate $V_{xy}$ and a horizontal deformation rate $V_z$ of the slope.

Further, the present disclosure determines a deformation stage of the slope through gradient of a slope deformation-time curve, and may better determine the slope state. An included angle between a tangent and an abscissa of a deformation curve at a certain moment, that is, a tangent angle $\alpha$. A formula for calculating the tangent angle $\alpha$ is as follows:

$$\alpha = \tan^{-1}\left(\frac{\Delta S}{\Delta t}\right)$$

where $\alpha$ represents the tangent angle, $\Delta S$ represents a variation of slope displacement per unit time period; and $\Delta t$ represents the unit time period.

The analysis and processing unit further sets danger early-warning level thresholds of the slope and the slope offset threshold according to the information of the slope.

The danger early-warning level thresholds are configured to determine whether a deformation rate of the slope, cumulative deformation of the slope, deformation acceleration of the slope, a crack opening degree, rainfall per unit time and soil water content computed by the analysis and processing unit reach a certain early warning level (that is, whether the index information above reaches a set index threshold), and under the condition that certain index reaches a certain early warning level, a highest early warning level is given.

The slope offset threshold is configured to determine whether a position of the monitoring point is located in the normal area, and under the condition that the slope offset exceeds the threshold, it is indicated that the monitoring point may not properly monitor the slope area, and needs to be rearranged according to the offset direction. In view of the threshold, the monitoring point may be guaranteed to perform accurate monitoring, and an invalid monitoring point is removed. In addition, the slope may be monitored again in time according to the slope offset.

For example, in the soil slope, under the condition that a deformation rate and deformation accumulation monitored by a high monitoring point gradually decrease, and a deformation rate and deformation accumulation monitored by a low monitoring point gradually increase, it indicates that an overall slope area moves down. In this case, in order to better monitor the slope area, when an offset exceeds the corresponding threshold, an alarm for the position of the monitoring point may be given to remind a relevant worker to rearrange a monitoring point according to an offset direction and an offset distance.

The slope offset is a sliding offset distance of a slope area between slopes. Specifically, due to different features of different slopes, there may be a situation that a main sliding direction or sliding extends to the periphery. The offset direction of the slope of the present disclosure is determined according to the tangent angle $\alpha$ of the slope computed by the analysis and processing unit and the variation $\Delta S$ of the slope displacement of the slope.

Specifically, the information of the slope includes soil quality information, a slope, geological information, and area information of the slope and environmental information of the slope area, that is, natural conditions excluding human factors. According to the information of the slope, the danger early-warning level thresholds and the slope offset threshold are determined.

Since natural conditions of different slopes are different, the thresholds are considered to be set differently. During actual setting, thresholds of the deformation accumulation, the deformation rate, etc. may be set based on finite element analysis of a strain intensity of an actual soil texture of the slope. Thresholds of rainfall, the soil water content, etc. may be determined with reference to rainfall classification of the National Meteorological Administration and combining a field measurement value. A threshold of the slope offset may be set mainly according to soil texture conditions of the slope and slope, which will not be repeated herein.

Embodiment 3

Embodiment 3 of the present disclosure is different from the above embodiment in that the early warning thresholds in the slope area introduced in the above embodiment are constant. In fact, since climate conditions and geological conditions in positions of the slope area are different, that is, the soil conditions and rainfall conditions are different, the landslide risks are different. Therefore, if the early warning thresholds are set consistently, a desirable monitoring effect may not be achieved in a targeted manner, and there may be certain potential risks.

In Embodiment 3, the analysis and processing unit divides the slope area according to information of the slope, and sets thresholds for positions, so as to achieve better overall monitoring of early warning.

Further, under the condition that the deformation position of the slope occurs at the boundary of the area divided by the analysis and processing unit, the analysis and processing unit uses the threshold with a small threshold range (that is, a threshold with a large early warning range) for an early warning, so as to guarantee to avoid a determination error of a slope area with higher risk due to slope area with lower risk, and guarantee safety of the slope.

Embodiment 4

Embodiment 4 of the present disclosure is different from the above embodiments in that the alarm of the position of the monitoring point in the above embodiment is set according to a constant slope offset threshold, but if the slope is in a danger early-warning state, even if the slope offset does not exceed a set threshold in this case, other factors may cause a great offset risk to the slope, as a result, a greater slope offset risk is caused when the slope offset is within the threshold range, and monitoring data of the monitoring point is not accurate enough in this case, and may not accurately monitor the landslide with risk in time in a targeted manner.

Therefore, in Embodiment 4, the analysis and processing unit further includes a first compulsory unit, the first compulsory unit is configured to compulsorily give an early warning of a monitoring point having a slope offset when the slope is in an early warning level, so as to guarantee that a relevant worker may rearrange the monitoring point in time, and facilitate targeted and accurate monitoring of a slope area where a slope early-warning is sent.

Further, when the early warning level of the slope area is too high, such as the first-level early warning, it is necessary to immediately take disaster prevention and risk avoidance measures, arrangement importance of the monitoring point is reduced, and it is unnecessary to adjust the monitoring point in this case. Therefore, when the slope early-warning level of a monitoring point area monitored by the first compulsory unit is a second-level early warning or below, the early warning of the position of the monitoring point may be merely compulsorily given, so as to avoid the condition that an alarm for the position of the monitoring point is given when the warning level is too high and arrangement importance of the monitoring point is lower than the state.

Further, a monitoring module of the present disclosure further includes a meteorological monitoring unit. When the slope offset is within the threshold range, the meteorological monitoring unit may predict that there will be heavy rainfall in the future, and the slope area is in an early warning state. In this case, if a sensor monitoring unit detects that rainfall and a soil water content are in an early warning state, it is difficult to rearrange the monitoring point due to heavy rainfall, making a monitoring effect worse.

Therefore, the analysis and processing unit further includes a second compulsory unit, and the second compulsory unit is configured to compulsorily give an early warning of the position of the monitoring point according to future rain early-warning information sent by the meteorological monitoring unit. Specifically, if future rain information monitored by the meteorological monitoring unit may cause the slope area to give an early warning, the second compulsory unit may give an early warning of the position of the monitoring point in this case to remind the relevant worker to perform rearrangement according to the offset direction of the slope in advance.

Embodiment 5

Figure 2:
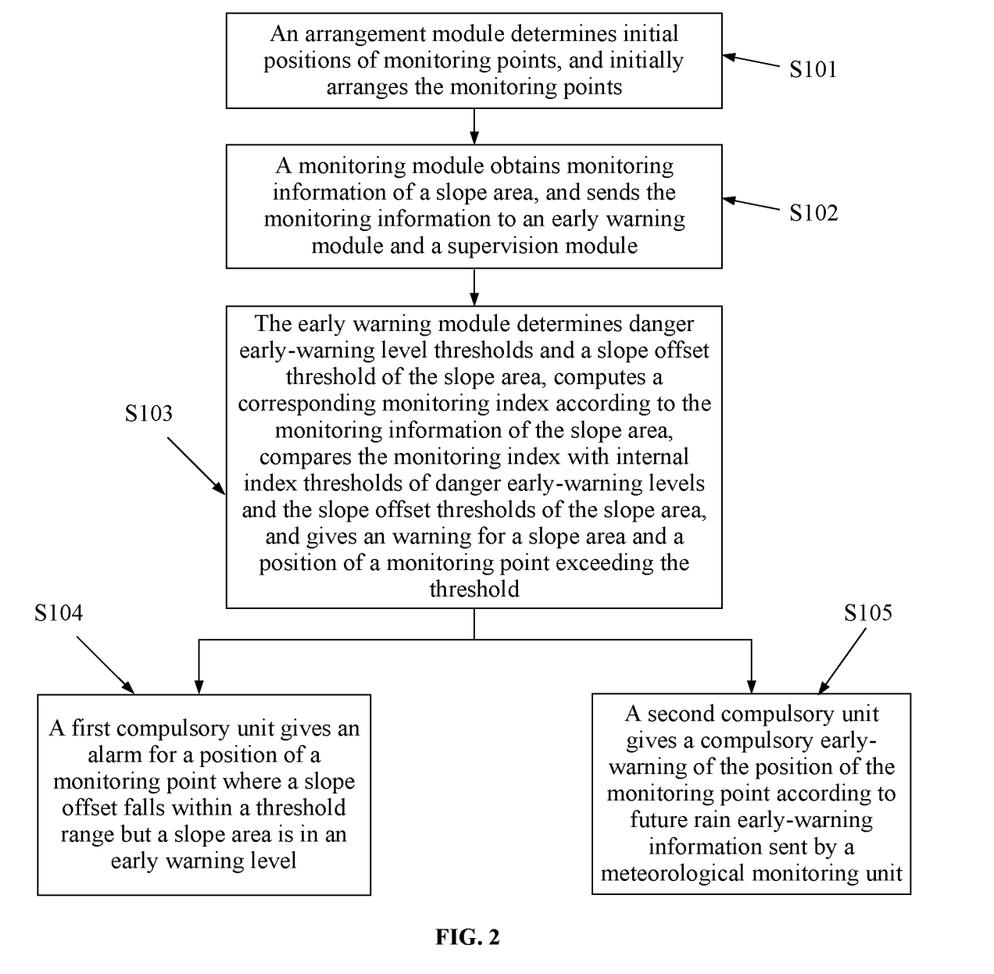
FIG. 2 is a flowchart of a Beidou communication-based integrated monitoring method for a slope surface crack according to the present disclosure.

Embodiment 5 of the present disclosure is different from the above embodiment in that a Beidou communication-based integrated monitoring method for a slope surface crack is introduced in Embodiment 5. As shown in FIG. 2, the following steps are included.

S101, an arrangement module determines initial positions of monitoring points, and initially arranges the monitoring points.

S102, a monitoring module obtains monitoring information of a slope area, and sends the monitoring module information to an early warning module and a supervision module.

Specifically, the monitoring information includes horizontal deformation and vertical deformation of a slope, real-time rainfall in the slope area, a crack degree, a soil water content and a future meteorological state of the slope area.

S103, an early warning module determines danger early-warning level thresholds and an slope offset threshold of the slope area, computes a corresponding monitoring index according to monitoring information of the slope area, compares the monitoring index with internal index thresholds of danger early-warning levels and the slope offset thresholds of the slope area, and gives an alarm for a slope area and a position of a monitoring point exceeding the threshold.

S104, A first compulsory unit gives an alarm for a position of a monitoring point where a slope offset falls within a threshold range but a slope area is in an early warning level.

S105, A second compulsory unit compulsorily gives an early warning of the position of the monitoring point according to future rain early-warning information sent by a meteorological monitoring unit.

Specifically, if the future rain information monitored by the meteorological monitoring unit may cause the slope area to give an early warning, the second compulsory unit may give an early warning of a position of a monitoring point in the slope area in this case.

S104 and S105 of the present disclosure are in parallel relation.

Further, in S103, the early warning module divides the slope area according to information of positions, and sets a danger early-warning level threshold and a slope offset threshold separately for areas.

The information includes soil quality information, a gradient, geological information, and area information of the slope and environmental information of the slope area, that is natural conditions excluding human factors.

Further, in S103, under the condition that a deformation position of the slope occurs at a boundary of an area divided by the analysis and processing unit, the analysis and processing unit uses a threshold with a small threshold range for an early warning.

Further, in S104, the warning level of the slope area does not include a first-level early warning.

Each embodiment of the description is described in a progressive mode, references can be made to each other for the same and similar parts between the embodiments, and each embodiment focuses on the difference from the other embodiments. Especially for a method embodiment, since the method embodiment basically depends on a system embodiment, description of the method embodiment is simple, and reference can be made to part of description of the system embodiment for relevant contents.

For the convenience of description, the above device is described by dividing the device into various units per function. It is certain that a function of each unit may be implemented in one or more pieces of software and/or hardware when the present application is implemented.

Finally, it is still necessary to be noted that first of all, in accompanying drawings of the embodiment of the present disclosure, merely a structure related to the embodiment of the present disclosure is involved, reference can be made to general design for other structures, and the same embodiment and different embodiments of the present disclosure can be combined with each other without conflict.

Secondly, those skilled in the art should understand that the embodiment of the present application can be provided as a method, a system, or a computer program product.

Therefore, the present application can take the form of an entire hardware embodiment, an entire software embodiment, or an embodiment combining software and hardware. Moreover, the present application can take the form of a computer program product implemented on one or more computer usable storage media (including but not limited to a disk memory, a CD-ROM, an optical memory, etc.) encompassing computer usable program codes.

The present application can be described in general context of computer-executable instructions, such as a program module, executed by a computer. Generally, the program module includes a routine, a program, an object, a component, a data structure, etc. that performs a specific task or implements a specific abstract data type. The present application can also be practiced in a distributed computing environment where a task is executed by a remote processing device connected through a communication network. In the distributed computing environment, the program module can be located in local and remote computer storage media including storage devices.

Finally, what are described above are merely preferred embodiments of the present disclosure but are not intended to limit the present disclosure, and any modification, equivalent replacement, improvement, etc. made within the spirit and principles of the present disclosure should fall within the protection scope of the present disclosure.

What is claimed is:

1. A Beidou communication-based integrated monitoring system for a slope surface crack, comprising an arrangement module, a monitoring module, an early warning module and a supervision module; wherein
the arrangement module is configured to determine positions of monitoring points of the monitoring system according to slope information;
the monitoring module is configured to monitor ecological data of a slope and meteorological information of a slope area, and send the ecological data of the slope and the meteorological information of the slope area to the early warning module and the supervision module;
the early warning module is configured to analyze a sliding trend and an offset degree of the slope according to the information sent by the monitoring module, determine whether geological deformation of the slope and arrangement positions of the monitoring points are in a normal state according to an analysis result, and give an alarm for a slope area and a position of a monitoring point in an abnormal state;
the supervision module is configured to supervise a communication state between modules, the arrangement positions of the monitoring points and an early warning state of the slope;
the early warning module comprises a data storage unit, an analysis and processing unit and a reminding and warning unit;
the data storage unit is configured to store various monitoring data monitored by the monitoring module;
the analysis and processing unit is configured to compare the monitoring data stored in the data storage unit with a pre-set early warning threshold, so as to obtain the geological deformation of the slope and monitoring effects of the monitoring points, determine whether the geological deformation of the slope and the monitoring effects of the monitoring points exceed the pre-set early warning threshold, and send a comparison result to the reminding and warning unit and the supervision module; and
the reminding and warning unit is configured to issue early warning information according to received comparison result sent by the analysis and processing unit wherein
the analysis and processing unit is configured to set a slope offset threshold according to information of the slope;
a slope offset threshold is configured to determine whether the positions of the monitoring points are located in a normal area, and under the condition that a slope offset exceeds the slope offset threshold, the monitoring points need to be rearranged according to an offset direction.

2. The Beidou communication-based integrated monitoring system for a slope surface crack according to claim 1, wherein the arrangement module comprises a slope information unit and a survey line layout unit;
the slope information unit is configured to confirm information of a slope to be monitored; and
the survey line layout unit is configured to preliminarily lay out a monitoring network of the slope and monitoring points on the monitoring network according to the information of the slope;
the information of the slope comprising soil quality information, a gradient, geological information, and area information of the slope and environmental information of the slope area.

3. The Beidou communication-based integrated monitoring system for a slope surface crack according to claim 2, wherein the monitoring module comprises a positioning data monitoring unit, a sensor monitoring unit, a meteorological monitoring unit and a monitoring station management unit;
the positioning data monitoring unit is configured to acquire Beidou high-precision positioning coordinate data, and monitor horizontal deformation and vertical deformation of the slope;
the sensor monitoring unit is configured to monitor real-time rainfall, a crack degree and a soil water content in the slope area;
the meteorological monitoring unit is configured to monitor future meteorological state of the slope area; and
the monitoring station management unit is in communication link with the positioning data monitoring unit, the sensor monitoring unit and the meteorological monitoring unit, and is configured to store and manage monitoring information and address information of a monitored area.

4. The Beidou communication-based integrated monitoring system for a slope surface crack according to claim 1, wherein the supervision module comprises a communication supervision unit, an electronic display unit and a system log unit;
the communication supervision unit is in communication link with the above modules, and configured to determine whether communication between the modules is normal;
the electronic display unit is configured to display positions of the monitoring points, monitoring data of the monitoring point and an early warning state of the monitoring point; and
the system log unit is configured to record a login account, a login IP and login time information, and search for an operation type of the account.

5. The Beidou communication-based integrated monitoring system for a slope surface crack according to claim 1, wherein a plurality of danger early-warning levels, that is, a first-level early warning, a second-level early warning, a third-level early warning and a fourth-level early warning in a descending order are set in the analysis and processing unit; and the analysis and processing unit further sets danger early-warning level thresholds of the slope according to the information of the slope.

6. The Beidou communication-based integrated monitoring system for a slope surface crack according to claim 5, wherein the danger early-warning level thresholds are configured to determine whether a deformation rate of the slope, cumulative deformation of the slope, deformation acceleration of the slope, a crack opening degree, rainfall per unit time and a soil water content computed by the analysis and processing unit reach a certain early warning level, and under the condition that a certain index reaches a certain early warning level, an early warning of a highest level is given.

7. The Beidou communication-based integrated monitoring system for a slope surface crack according to claim 1, wherein the analysis and processing unit divides the slope area according to the information of the slope, and sets thresholds for positions; and under the condition that a deformation position of the slope occurs at a boundary of an area divided by the analysis and processing unit, the analysis and processing unit uses a threshold with a small threshold range for an early warning.

8. The Beidou communication-based integrated monitoring system for a slope surface crack according to claim 5, wherein the analysis and processing unit further comprises a first compulsory unit, the first compulsory unit is configured to compulsorily give an early warning of a monitoring point having a slope offset when the slope is in an early warning level; and when an early warning level of a slope area where the monitoring point is located monitored by the first compulsory unit is the second-level early warning or below, a warning for a position of the monitoring point is compulsorily given.

9. The Beidou communication-based integrated monitoring system for a slope surface crack according to claim 1, wherein the analysis and processing unit further comprises a second compulsory unit, the second compulsory unit is configured to compulsorily give an early warning of the position of the monitoring point according to future rain early-warning information sent by the meteorological monitoring unit.

\* \* \* \* \*